(12) United States Patent
Quesenberry

(10) Patent No.: US 6,945,589 B2
(45) Date of Patent: Sep. 20, 2005

(54) TRUCK BED CAP ASSEMBLY DEVICE

(75) Inventor: Michael Quesenberry, White Lake, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 10/397,840

(22) Filed: Mar. 27, 2003

(65) Prior Publication Data

US 2004/0189048 A1 Sep. 30, 2004

(51) Int. Cl.[7] .............................. B60P 7/02; B60P 3/325
(52) U.S. Cl. .................... 296/100.02; 296/43; 296/164
(58) Field of Search ............ 296/3, 43, 100.01–100.04, 296/100.17, 157, 163, 164, 167, 190.03; D12/401, 406; 280/756

(56) References Cited

U.S. PATENT DOCUMENTS

| | | | | |
|---|---|---|---|---|
| 2,690,351 A | * | 9/1954 | Giles | 296/102 |
| 3,486,785 A | * | 12/1969 | Corson | 296/167 |
| 3,623,690 A | * | 11/1971 | Bargman, Jr. | 410/116 |
| 4,202,579 A | | 5/1980 | Berggren | |
| 4,378,127 A | * | 3/1983 | Rossi, Sr. | 296/3 |
| 4,627,655 A | * | 12/1986 | Collins | 296/167 |
| 4,815,787 A | * | 3/1989 | Hale | 296/167 |
| 4,932,717 A | | 6/1990 | Swann | |
| 5,054,841 A | | 10/1991 | Zalman | |
| 5,228,739 A | | 7/1993 | Love | |
| 5,299,849 A | | 4/1994 | Cook et al. | |
| 5,316,366 A | | 5/1994 | Wilkins | |
| 5,423,587 A | | 6/1995 | Ingram | |
| 5,735,565 A | | 4/1998 | Papai et al. | |
| 5,765,902 A | | 6/1998 | Love | |
| 6,290,441 B1 | | 9/2001 | Rusu | |
| 6,394,532 B1 | * | 5/2002 | Dence | 296/165 |
| 6,505,879 B1 | * | 1/2003 | Arviso | 296/100.18 |

FOREIGN PATENT DOCUMENTS

FR 34052 * 5/1929 ............... 280/756

* cited by examiner

Primary Examiner—Dennis H. Pedder
(74) Attorney, Agent, or Firm—Foley & Lardner LLP

(57) ABSTRACT

A truck bed cap assembly having a rigid truck bed cap and a truck bed cap retention device having two generally vertical sections and a cross section connecting the vertical sections wherein the two generally vertical sections protrude through holes in the roof of the cap and are adapted to be attached to a truck to provide positive retention of the truck bed cap to the truck in at least one direction, and wherein the cross section alone or in combination with the vertical sections substantially spans the lateral direction of the cap.

54 Claims, 10 Drawing Sheets

TRUCK BED CAP ASSEMBLY DEVICE

BACKGROUND OF THE INVENTION

Pickup trucks utilizing truck bed caps are well known in the industry. Typically these caps comprise a fiberglass or plastic molded structure that is configured to fit directly over the bed of a pickup truck. These devices usually allow for items to be transported in the pickup truck while still providing a level of protection against the elements as if it were being transported in, for example a moving van or another type of totally enclosed vehicle. Often, these devices are referred to as camper tops in that pickup trucks configured with such devices often are used by hunters or sportsmen as sleeping areas. Traditionally, truck bed caps are attached to pickup trucks utilizing fastening devices. For example, U.S. Pat. No. 5,228,739, entitled Truck Cap Clamp, the contents of which is incorporated herein by reference in its entirety, features a clamp that is used to connect a truck cap to the rear of a pickup truck. Alternatively, or in addition to this, truck bed caps are connected to pickup trucks utilizing mounting rails such as the device disclosed in U.S. Pat. No. 5,316,366, entitled Camper Shell Mounting Rail, the contents of which is likewise incorporated herein by reference.

An attribute of these devices is that they may not provide retention of the cap with the pickup truck in the event of a collision. Further, truck bed caps utilizing the just mentioned devices do not provide a hard mounting surface on the roof of the truck bed cap or on the insides of the truck bed cap. While it is true that many truck bed caps are fashioned with devices with "hard points" on the inside and/or on the outside of the caps, they are only as strong as the cap structure itself.

In an effort to provide or maintain the ability to mount items on the outside of the camper shell, camper shells have been devised that conform to existing light bars and the like with pickup trucks. For example, U.S. Pat. No. 4,202,579 entitled, Camper Shell Structure, the contents of which is incorporated herein by reference in its entity, discloses a truck bed cap that has a smaller forward section that fits inside the roll bar assembly of a standard pickup truck. While this permits hard mounting surfaces on the outside of the truck bed cap, it does not allow for hard mounting surfaces on the inside of the cap. Furthermore, by reducing the interior volume of the forward section of the cap, the amount of storage space and utility space inside the truck bed cap is reduced.

Also, prior art retention devices do not address the possibility of installation error of the cap to the truck.

Increasingly, truck bed caps are becoming very expensive. Furthermore, customization of truck bed caps is on the rise. Thus, there is a desire on the part of the truck bed cap owners to protect the truck bed caps in the event of a collision, or simply to protect it from theft. Thus, it is desirable to minimize the possibility that the truck bed cap will become dislodged from the truck especially when involved in a collision.

The present inventor has invented a device that will help provide positive retention of a truck bed cap to a pickup truck that is involved in a collision, as well as maximizing the available storage space inside the truck bed cap and providing for maximum utility of the pickup truck while the pickup truck is configured with the truck bed cap.

SUMMARY OF THE INVENTION

In a first embodiment of the present invention, there is a truck bed cap assembly comprising, a rigid truck bed cap; and a truck bed cap retention device comprising two generally vertical sections and a cross section connecting the vertical sections; wherein the two generally vertical sections protrude through vertical holes in the roof of the cap and are adapted to be attached to a truck to provide positive retention of the truck bed cap to the truck in at least one direction, and wherein the cross section alone or in combination with the vertical sections substantially spans the lateral direction of the cap.

In another embodiment of the present invention, the truck bed cap has a plurality of flanges that protrude from lower sides of the cap, the flanges having spaces to allow the vertical sections to pass through the flange.

In another embodiment of the present invention, the spaces are holes to allow the vertical sections to pass through the flange.

In another embodiment of the present invention, the flanges are notched to allow the vertical sections to pass through the flange.

In another embodiment of the present invention, the roof of the cap is in contact with the vertical sections.

In another embodiment of the present invention, the cross section is in contact with the roof of the cap or a linking member that is in contact with the roof of the cap.

In another embodiment of the present invention, the roof of the cap is in contact with the vertical sections at the holes in the cap.

In another embodiment of the present invention, the structure of the roof of the cap is in contact with the vertical sections.

In another embodiment of the present invention, the just discussed contact is formed at least by a seal.

In another embodiment of the present invention, the seal is a gasket.

In another embodiment of the present invention, the truck bed cap is adapted to limit or substantially prevent leakage of rain water at the holes into the interior of the cap.

In another embodiment of the present invention, the vertical sections and the cross section of the retention device is of one piece construction.

In another embodiment of the present invention, the cap is formed around the retention device.

In another embodiment of the present invention, the vertical sections are separate components and the cross section is a separate component, the vertical sections and the cross section of the truck bed cap being of at least 3-piece construction.

In another embodiment of the present invention, the vertical sections and the cross section are of 3-piece construction.

In another embodiment of the present invention, the vertical sections fit into the cross section.

In another embodiment of the present invention, the truck bed cap retention device is adapted to be mounted to a truck stake pocket.

In another embodiment of the present invention, the truck bed cap retention device is adapted to be mounted to a truck bed side wall top surface.

In another embodiment of the present invention, the vertical sections are configured with a stake adapted to mate with a truck stake pocket.

In another embodiment of the present invention, the stakes are part of the vertical sections.

In another embodiment of the present invention, the stakes are provided with a threaded portion having an axis substantially normal to the vertical direction of the stake.

In another embodiment of the present invention, the stakes are provided with a floating nut.

In another embodiment of the present invention, the truck bed cap retention device is adapted to be attached to a truck with bolts.

In another embodiment of the present invention, the truck bed cap retention device is located at about the longitudinal forward end of the cap.

In another embodiment of the present invention, the cross section is located on the outside of the cap.

In another embodiment of the present invention, the cross section is configured with attachment points on the outside of the cap.

In another embodiment of the present invention, the vertical sections are provided with attachment points on the inside of the cap.

In another embodiment of the present invention, the cross section is substantially parallel to the roof of the cap.

In another embodiment of the present invention, the cap is formed integrally with the retention device.

In yet another embodiment of the present invention, there is a truck bed cap assembly comprising a truck bed cap having a plurality of flanges that protrude from lower sides of the cap; and a truck bed cap retention device adapted to interface with the truck bed cap and to be attached to a truck bed, the truck bed cap retention device being adapted to positively retain the cap in both the horizontal and vertical directions when the retention device is attached to the truck bed and interfacing with the cap, wherein the truck bed cap retention device comprises a plurality of generally vertical sections comprising stakes adapted to mate with a truck stake pocket.

In another embodiment of the present invention, the flanges have spaces adapted to permit the generally vertical sections to pass through the flange and be attached to a truck.

In another embodiment of the present invention, the vertical sections have a protrusion that extends in the horizontal direction past the space in the flange when the retention device is attached to the truck to retain the cap to the truck.

In another embodiment of the present invention, the flange of the cap has an upper flat surface facing away from the truck bed, and wherein the protrusions are flanges having a lower surface that has a portion that is substantially parallel to the upper surface of the flange of the cap.

In another embodiment of the present invention, the protrusions interface with the upper surface of the flange of the cap.

In another embodiment of the present invention, the flange protrusion extends away from all sides of the generally vertical sections.

In another embodiment of the present invention, two of the generally vertical sections extend away from the truck bed and protrude through vertical holes in the roof of the cap.

In another embodiment of the present invention, two generally vertical sections that protrude through holes in the roof are connected by a cross section that substantially spans the lateral direction of the cap on the outside of the cap.

In another embodiment of the present invention, two of the generally vertical sections extend away from the truck bed and protrude through vertical holes in the roof of the cap.

In another embodiment of the present invention, the two generally vertical sections that protrude through holes in the roof are connected by a cross section that substantially spans the lateral direction of the cap on the outside of the cap.

In yet another embodiment of the present invention, there is a truck bed cap assembly comprising a rigid truck bed cap; and a truck bed cap retention device comprising two generally vertical sections and a cross section connecting the vertical sections; wherein the cross section protrudes through horizontal holes in the roof of the cap and the vertical sections are adapted to be attached to a truck to provide positive retention of the truck bed cap to the truck in at least one direction, and wherein the cross section alone or in combination with the vertical sections substantially spans the lateral direction of the cap.

In yet another embodiment of the present invention, there is a truck bed cap assembly comprising a rigid truck bed cap; and a truck bed cap retention device comprising one or more beams in an inverted "U" configuration; wherein a portion of the "U" protrudes through holes in an upper portion of the cap, and wherein the "U" is adapted to be attached to a truck to provide positive retention of the truck bed cap to the truck in at least one direction, and wherein the "U" substantially spans the lateral direction of the cap.

In another embodiment of the present invention, the two legs of the "U" protrude through vertical holes in the roof.

In another embodiment of the present invention, the component that connects the legs of the "U" protrudes through horizontal holes in the roof.

In another embodiment of the present invention, the truck bed cap has a plurality of flanges that protrude from lower sides of the cap, the flanges having spaces to allow the legs of the "U" to pass through the flange.

In another embodiment of the present invention, the cap is formed around the retention device.

In another embodiment of the present invention, the retention device is of 3-piece construction.

In another embodiment of the present invention, there is a truck comprising a truck bed, and a truck bed cap assembly according to any of the just described embodiments.

In another embodiment of the present invention, there is a truck bed cap retention device for a truck bed cap comprising a truck bed cap retention device adapted to interface with a truck bed cap and to be attached to a truck bed, the truck bed cap retention device being adapted to positively retain a cap in both the horizontal and vertical directions when the retention device is attached to the truck bed and interfacing with the cap, wherein the truck bed cap retention device comprises a plurality of generally vertical sections comprising stakes adapted to mate with a truck stake pocket.

In another embodiment of the present invention the vertical sections have a protrusion that extends in the horizontal direction.

DETAILED DESCRIPTION OF THE PREFERRED EMBODIMENTS

Figure 1:
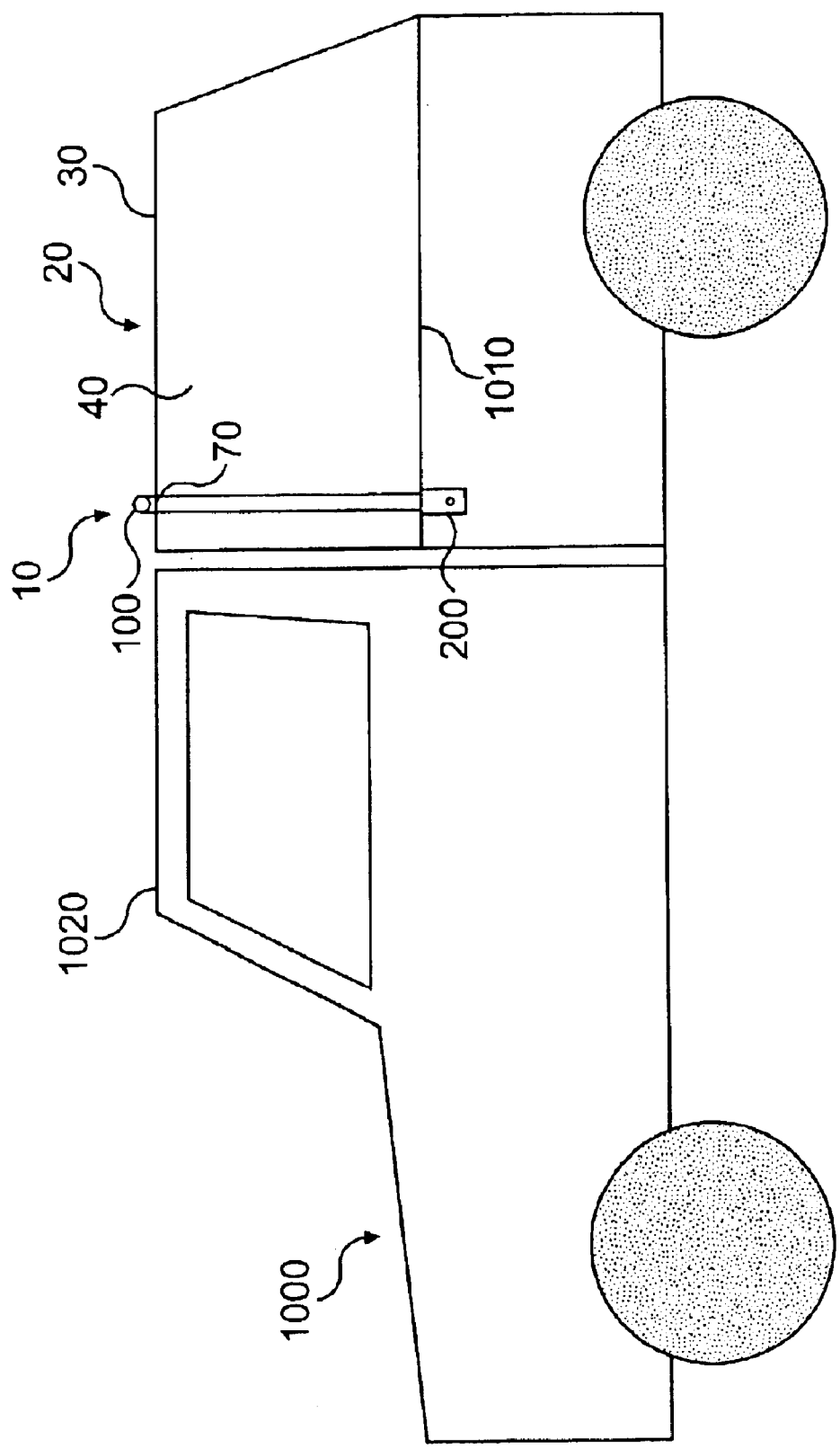
FIG. 1 is a side view of a first embodiment of the present invention.
Figure 2:
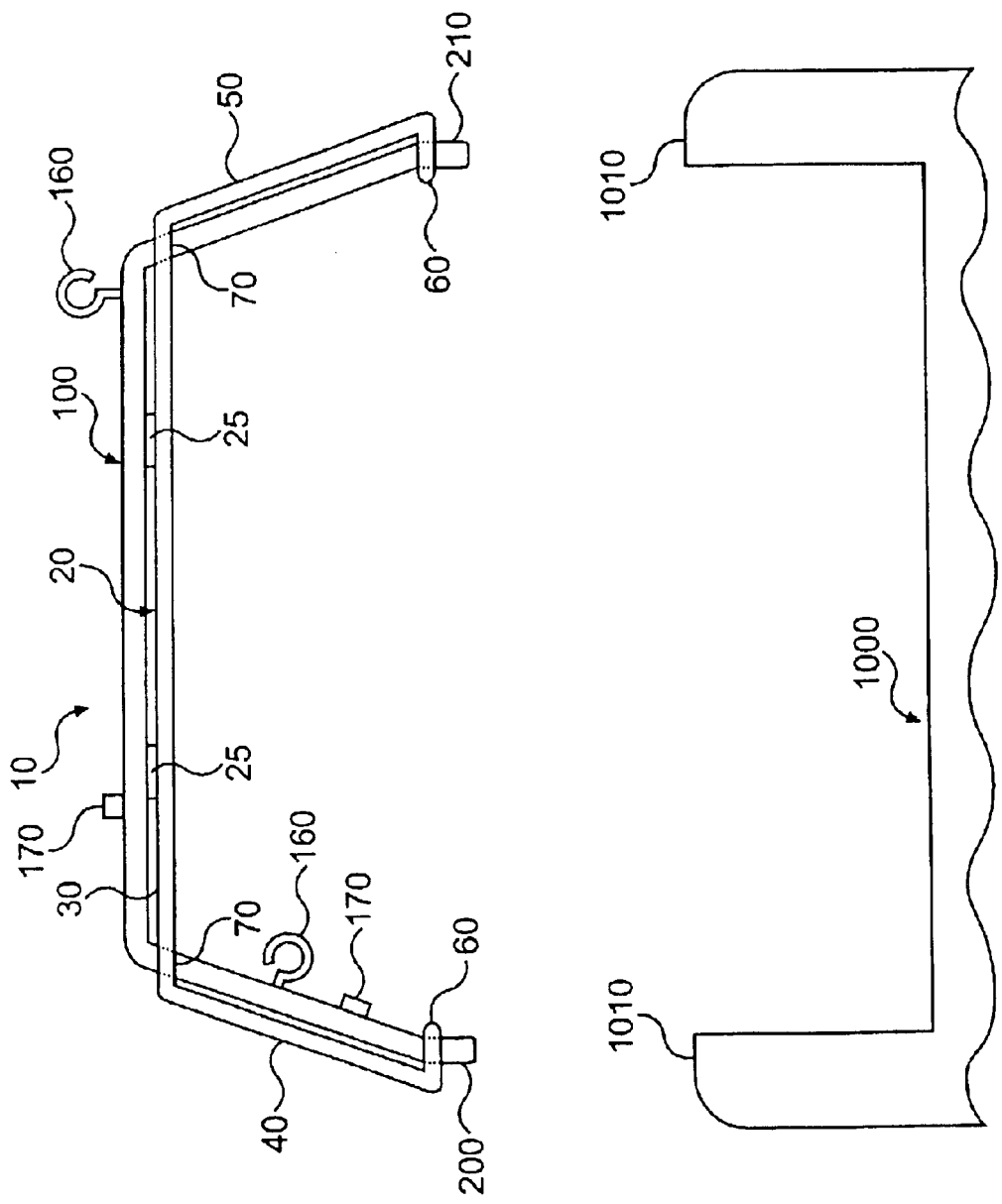
FIG. 2 is an exploded rear view of the first embodiment of the present invention.

In the first embodiment of the present invention, there is a truck bed cap assembly 10 as shown in FIGS. 1 and 2. The assembly comprises a truck bed cap 20 and a truck bed cap retention device 100. The truck bed cap 20 has a roof 30 and sidewalls 40 and 50 that extend along the longitudinal direction of the truck bed cap. In the first embodiment of the present invention, the truck bed cap retention device 100 extends, when placed on a truck with a truck cap, from the outer panels 1010 of the truck 1000 through holes 70 in the roof 30 of the truck bed cap 20, and across the bed of the truck.

In the first embodiment, retention of the truck bed cap to the truck is aided by the contact of the roof 30 of the cap 20 with the retention device 100 at the location where the holes 70 in the roof are located. That is, the cap 20 is structurally attached to the retention device 100 at least in the location of the holes 70. The retention device 100 is attached to the truck by stakes 200 that interface with stake pockets commonly found in the outer panels of trucks.

In the first embodiment, the cap 20 is a standard truck bed cap which is similar to or the same as but can also be different than typical truck bed caps that enclose all or part of a truck bed on a typical pickup truck or SUV or other vehicle having a bed in the back. Most embodiments of the present invention are not limited to a size or shape of a truck bed or a truck bed cap. As can be seen from FIGS. 1–4 (some components and reference numbers removed for clarity), the truck bed cap has a roof 30 and sidewalls 40 and 50 that extend along the longitudinal direction of the truck bed cap, where the longitudinal direction is defined by the front portion of the cap and the rear portion of the cap when the cap is placed on a pickup truck. (The front being the part closest to the cab of the truck 1000.) These sidewalls 40 and 50 form the lateral sides of the truck bed cap. In one embodiment, shown in FIG. 2, the lateral sides have flanges 60 at or near the bottom of the truck bed cap. The flanges extend inwards towards the center of the truck bed cap and are configured to provide support for the truck bed cap when the truck bed cap is positioned on the bed of a pickup truck. In the first embodiment, the flanges are parallel with the top surfaces of the outer panels 1010 of the truck bed.

It is noted that in the present invention, the truck bed cap 20 is a rigid truck bed cap. By way of example, the truck bed cap can be made from fiberglass or steel or aluminum or plastic or combination thereof or any other sufficiently rigid material. Thus, the present invention would not be practiced with a foldable canvas truck bed cap or the like. However, this does not mean that the present invention would not be practiced with a truck bed cap that utilizes a combination of rigid and flexible components. By way of example, a cap that has a rigid roof and rigid sidewalls but a flexible plastic rear portion could be used to practice the present invention. Further by way of example, alternatively, a rear portion that is a cloth mesh could be used to practice the invention. Basically, any form of truck bed cap could be used to practice the invention as long as the truck bed cap is rigid or substantially rigid where the truck bed cap interfaces the truck and the truck bed cap retention device (as described below).

It is noted that the truck bed cap of the first embodiment has a generally symmetrical configuration. That is, the outer surfaces of the sides and the roof lie on substantially the same planes, with, of course, areas for windows and air vents or other protrusions in the roof and the sides, for example. However in other embodiments of the present invention, the truck bed cap is contoured and is of a more complicated configuration. The roof may lie on two or more separate planes that may be parallel to each other or may be at angles to each other. That is, the roof could be contoured so that, for example, it gradually increases or decreases in elevation from the forward to the back. Alternatively, for example, the roof of the truck bed could increase in step formation. This is also the case with the sides of the truck bed cap. Basically, any configuration of a truck bed cap will work with the present invention, as long as the truck bed cap is rigid or substantially rigid where the truck bed cap interfaces the truck and the truck bed cap retention device (as described below).

It is further noted that in the present invention, the truck bed cap assembly of the present invention allows a truck bed cap to be attached to a truck and still maintain or substantially maintain a uniform outer and inner configuration. That is, the cap does not have to be reduced in size or contoured to fit inside, say, a light bar, and a cap of generally uniform configuration can be attached to the pickup truck with the retention device. Thus, the present invention can be practiced with a cap that is not substantially contoured. Further, the present invention can be practiced with a cap that has a substantially uniform interior volume when comparing the front to the back. However, the present invention can be utilized with a cap that has a non-uniform volume.

As can be seen from FIG. 1, the present invention also includes a truck bed cap retention device 100. The retention device 100 of the first embodiment of the present invention substantially extends from one side of the pickup truck to the other side of the pickup truck. That is, the device extends substantially across the truck bed. For example, the device could extend from the top surface of the left side wall to the right surface of the side wall, or could extend from the left side of the truck bed near the left side wall to the right side of the truck bed near the right side wall, much like or the same as a roll bar. In the first embodiment, the device 100 forms an inverted "U" with the legs attached to the outer panels 1010 of the truck bed. However, it is noted that the device does not necessarily need to extend entirely across the truck bed. That is, the device could be configured to be mounted to the bed of the truck inside of the outer panels of the pickup truck bed. Thus, the device would not necessarily extend entirely across the truck bed; the device would only extend across a portion of the truck bed. Furthermore, embodiments of the present invention can be practiced where the device is mounted to the pickup truck perhaps forward of the truck bed or positioned on the upper surface of the forward panel of the truck bed. For example, in the case of a pickup truck where the truck bed forms a separate unit from the cab of the pickup truck, the device could extend along the forward wall that forms the truck bed (as opposed to the "wall" that forms the tailgate).

Figure 3:
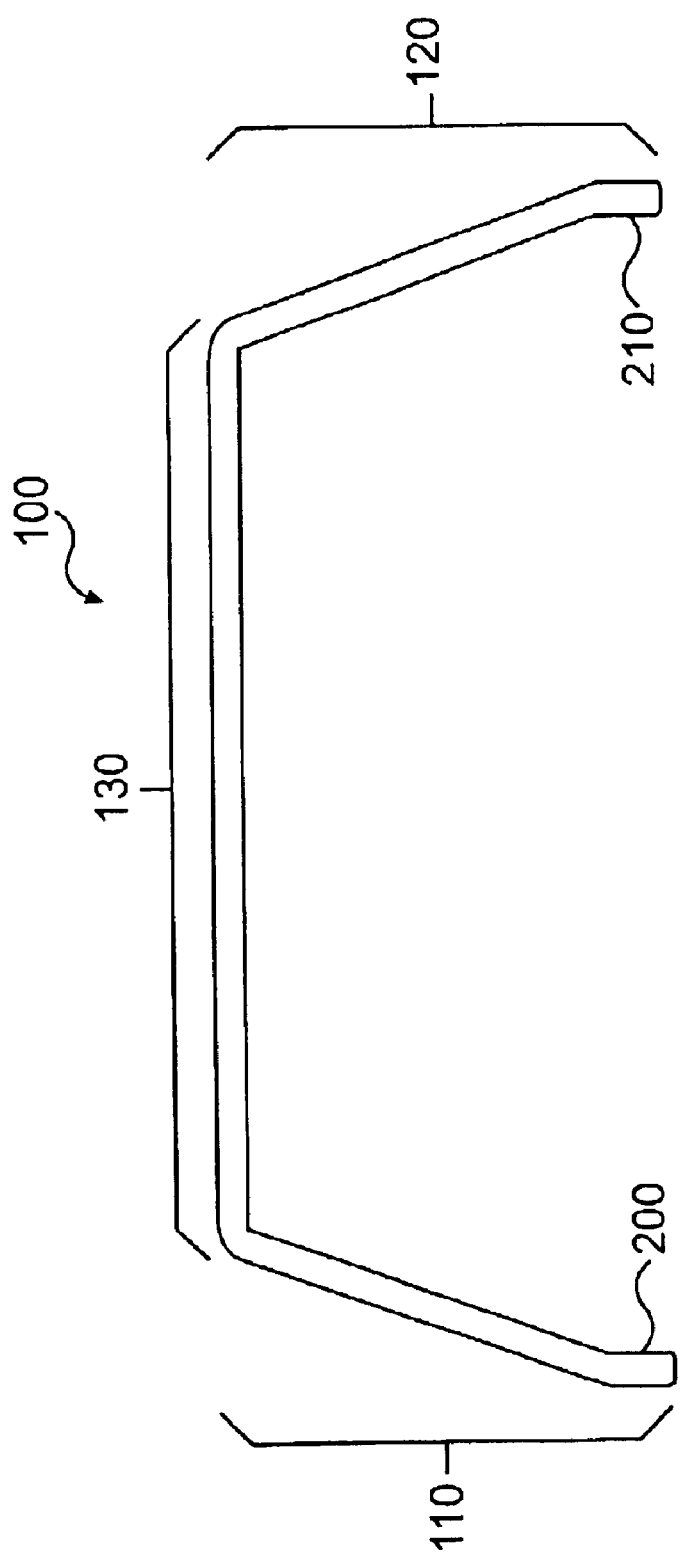
FIG. 3 is rear view of the first embodiment of the present invention.
Figure 5A:
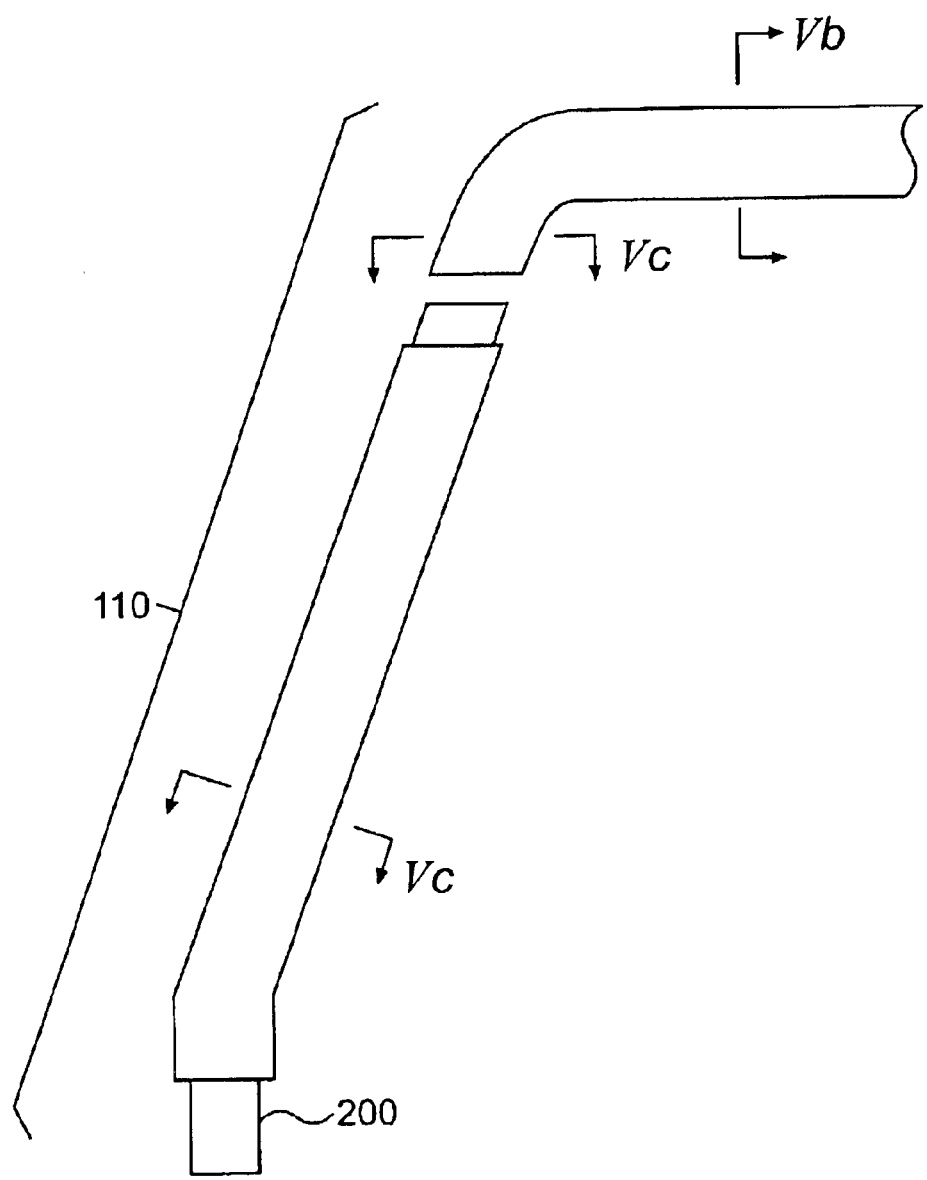
FIG. 5a is a rear view of a portion of the retention device of another embodiment of the present invention.
Figure 5B:
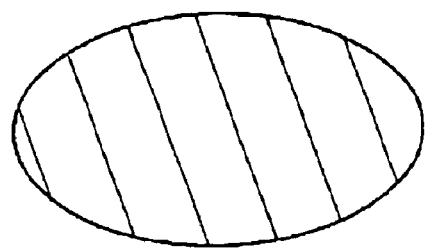
FIG. 5b is a cross sectional view of a section of the retention device of the embodiment shown in FIG. 5a of the present invention.
Figure 5C:
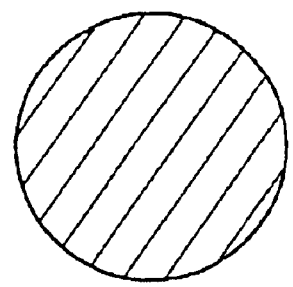
FIG. 5c is a cross-section of another section of the retention device of the embodiment shown in FIG. 5a of the present invention.

In the first embodiment, the device 100 has two generally vertical sections 110 and 120, as is labeled in FIG. 3, that are generally vertical when placed on the truck bed and attached to the cap (as described below). Generally vertical will be defined in regard to these two sections 110 and 120 as meaning that they substantially extend upwards or downwards in a significant manner when attached to a truck or vehicle. It does not rule out a horizontal component of the vertical sections, as is shown in FIG. 2 and FIG. 5. Indeed, the first embodiment of the vertical sections extends both in a horizontal and vertical direction. Also, in the first embodiment, the generally vertical sections extend past the top of the cab 1020.

In a first embodiment of the present invention, vertical sections 110 and 120 of the device extend through the roof of the cap 20, as can be seen in FIG. 1. It is this feature of the first embodiment of the present invention that aids in positive retention of the truck bed cap to a truck when the vertical sections 110 and 120 are attached to a truck, because, in the first embodiment, if the cap 20 and/or truck 1000 were subjected to, for example, a horizontal force sufficient under normal conditions to cause movement of the cap, the cap 20 would be restricted from substantial horizontal movement (as compared to normal conditions) when the cap 20 contacted either or both of the vertical sections. This would, of course, be the case where the cap is in direct physical contact with either or both of the vertical sections prior to experiencing the force.

Positive retention is defined as structure physically blocking the movement or significant movement of the truck bed cap 20 in one or more directions, thus helping to retain the truck bed cap to the truck, as opposed to mere friction preventing the movement of the truck bed cap. For example, a vertically aligned clamp would provide positive retention in the vertical direction but does not provide positive retention in the horizontal direction because if one were to push hard enough or to provide a sufficient amount of horizontal force to one of the clamped components, the components would slide horizontally at some point. As inferred above, the present invention functions to help retain the cap to the truck. This does not mean that it prevents the cap from moving. Indeed, in some embodiments, it is desirable for the cap to be able to move with respect to the retention device, as long as the device provides for positive retention in at least one direction.

Further, it is noted that while most of the embodiments of the present invention are directed towards retention of the cap 20 to the truck 1000 in the event of a collision, many embodiments of the present invention are directed towards simple security of a truck bed cap. To this end, the present invention can be characterized as an invention to help minimize the movement of a truck cap and/or to help enhance truck bed cap retention in the event of a collision.

Positive retention in the horizontal direction is accomplished in the first embodiment by forming holes 70 in the forward left and right sides of the roof of the cap. These holes are of sufficient size to allow the vertical sections 110 and 120 to pass through the holes. It is noted that in the first embodiment, the holes in the roof are circular and the sections of the device are likewise circular or substantially circular. However, the present invention is not limited to a hole having a circular cross section. By way of example, the holes could be square or could be rectangular or could be oval shaped, etc, or a combination thereof. Basically, any size or shape hole that will permit the sections 110 and 120 of the device to pass through the roof of the cap will be sufficient to practice the present invention. In the first embodiment of the present invention, the holes are vertical holes. That is, the holes are elongated in a direction that has a substantially vertical component. Further, any shape vertical sections 110 and 120 and cross section 130 (see FIGS. 3 and 5) would be suitable to practice the present invention (e.g. oval shaped, circular shaped, rectangular shaped, triangular shaped, square shaped, etc., or any combination thereof). Examples of the combination of sections can be seen at FIGS. 5b and 5c. It is noted that while the figures show solid cross-sectioned vertical sections and cross sections, the present invention can be practiced with hollow cross-sectioned vertical sections and/or cross sections.

The holes in the roof allow sections 110 and 120 to pass through the roof, further allowing cross section 130 to interface with sections 110 and 120, thus forming a rough inverted "U" shaped retention device. In the first embodiment of the present invention, the section 130 that connects sections 110 and 120 together is substantially parallel to the roof of the trailer cap, although other embodiments of the present invention can be practiced where the cross section 130 is not substantially parallel to the roof of the cap.

Figure 6:
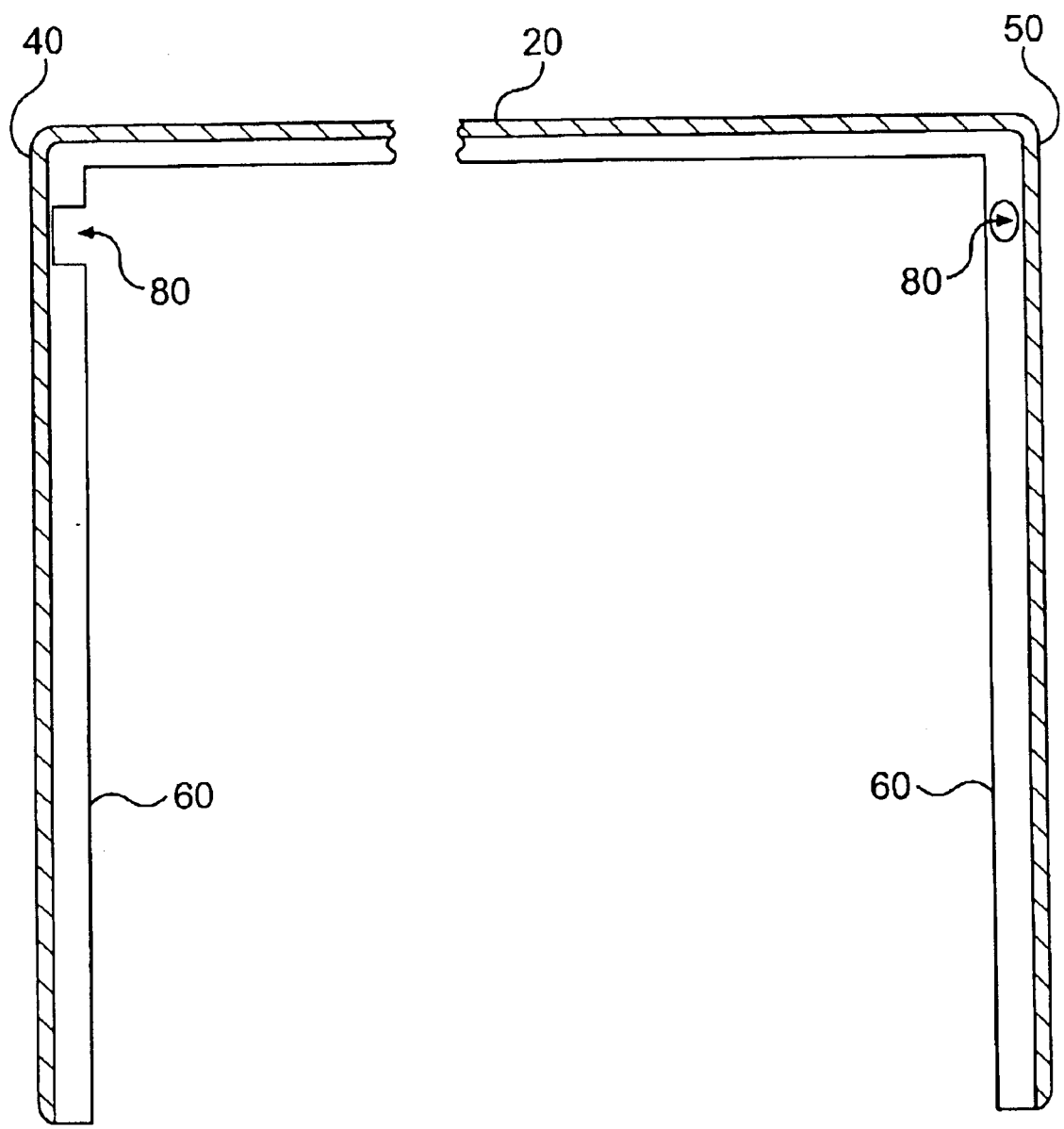
FIG. 6 is top cross-sectional view of another embodiment of the present invention, the cross-section being taken just above the flange of the truck cap.

In the first embodiment of the present invention that utilizes a cap that has flanges 60 that extend from the lateral sides in the lower portions of the trailer cap, the flanges 60 are configured with spaces 80 to permit passage of the sections 110 and 120 through the flange. In one embodiment of the present invention, the spaces are holes that can be but do not have to be of similar dimensions to the holes in the roof, as is shown to the right in FIG. 6. In another embodiment of the present invention, the spaces are notches in the flanges 60, as is shown to the left in FIG. 6. That is, the flanges do not completely surround sections 110 and 120. While the first embodiment of the present invention is practiced with a cap that has flanges, the present invention can be practiced with a cap that does not have flanges 60 as well, in which case the present invention could be configured so that the sections 110 and 120 would only pass through the material of a cap in two locations: the roof of the cap on the left and right sides of the roof.

In one embodiment of the present invention, the retention device is configured with hooks 160 or attachment points 170 along the sections 110 and/or 120 and/or along the cross section. In such an embodiment, when the cap and retention device are placed on the truck, the sections 110 and 120 would be on the inside of the cap and the cross section would be on the outside of the cap thus allowing equipment or utility items to be connected to or hung from the sections 110 and 120, protecting them from the weather elements because they are inside of the cap. Still further, equipment such as a light bar or a ski rack or a utility support rack (i.e., a ladder holder) could be attached to the cross section, thus allowing these articles to be positioned on the outside of the cap.

Figure 4:
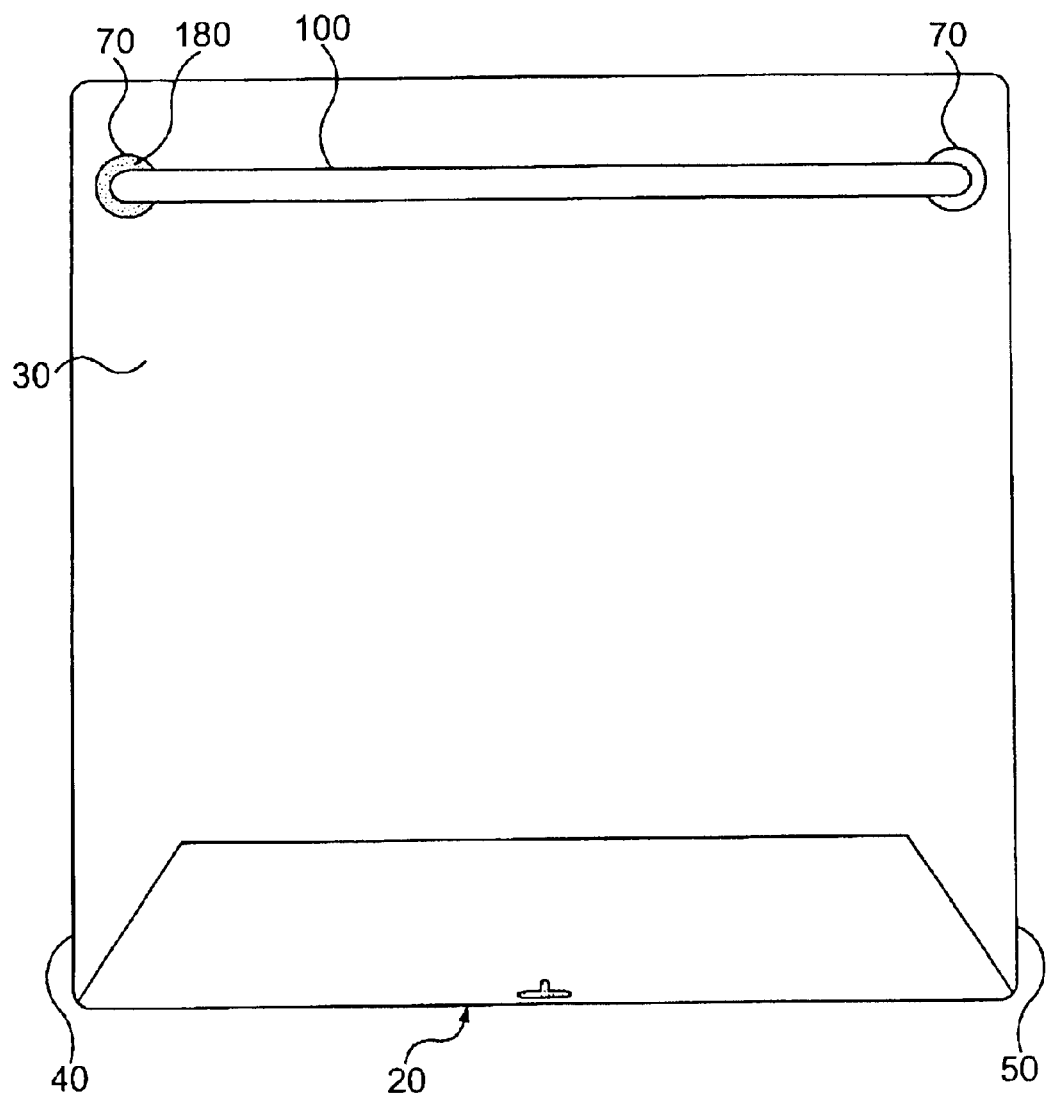
FIG. 4 is a top view of the first embodiment of the present invention.

Due to the fact that the sections 110 and 120 protrude through holes through the roof of the cap, it is preferable that these holes be sealed or that the holes be reduced in size as much as possible and preferably mating with and touching the sections 110 and 120. In one preferred embodiment, the clearance between the holes and the sections 110 and 120 are such that rainwater or other elements cannot enter the cap because the holes are tight around the sections. This further provides structural support to the cap in the event of a collision, thus protecting the cap and helping prevent it from becoming dislodged. However, in other embodiments, the present invention utilizes a seal 180 as the interface between the holes of a cap and the sections 110 and 120, as is seen in FIG. 4. This seal can prevent rainwater from entering the cap through the holes in the roof by sealing the gap between the holes and the section. In a preferred embodiment, the seal is a gasket, although other embodiments could utilize caulk or weather stripping. Alternatively or in addition, a shingle type system could be used where no true seal is made but water cannot protrude directly into the cap or the water is directed away from the holes. However, it is noted that in the case where the cap is in direct contact with sections 110 and 120, a sealing device and/or a shingle device could be used as well. It is further noted that in some embodiments of the present invention, no seals or shingle device would be used.

Figure 7:
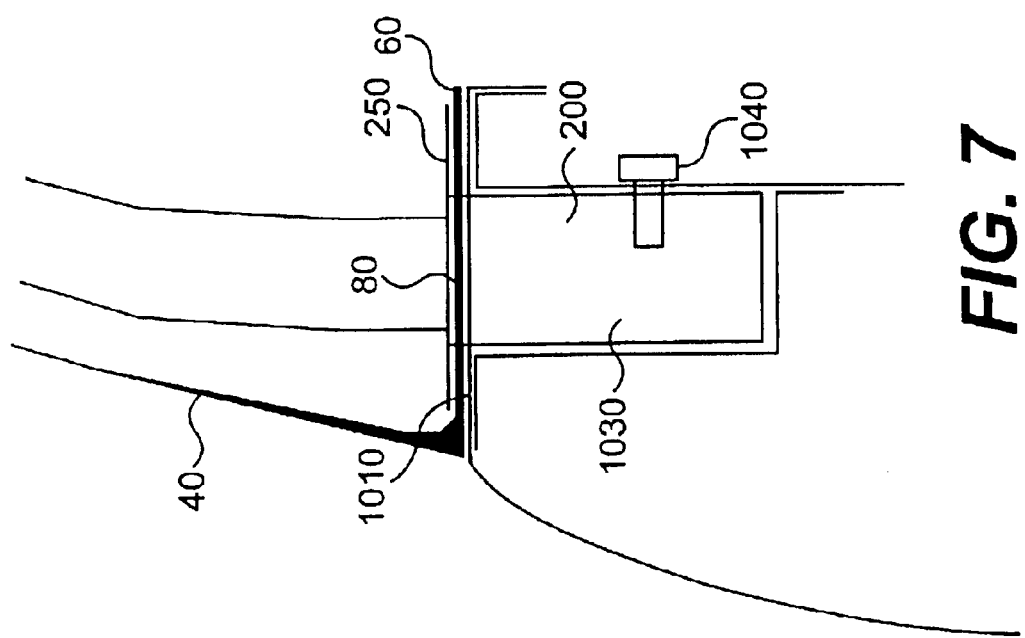
FIG. 7 is a rear view of a portion of the retention device of another embodiment of the present invention.
Figure 8:
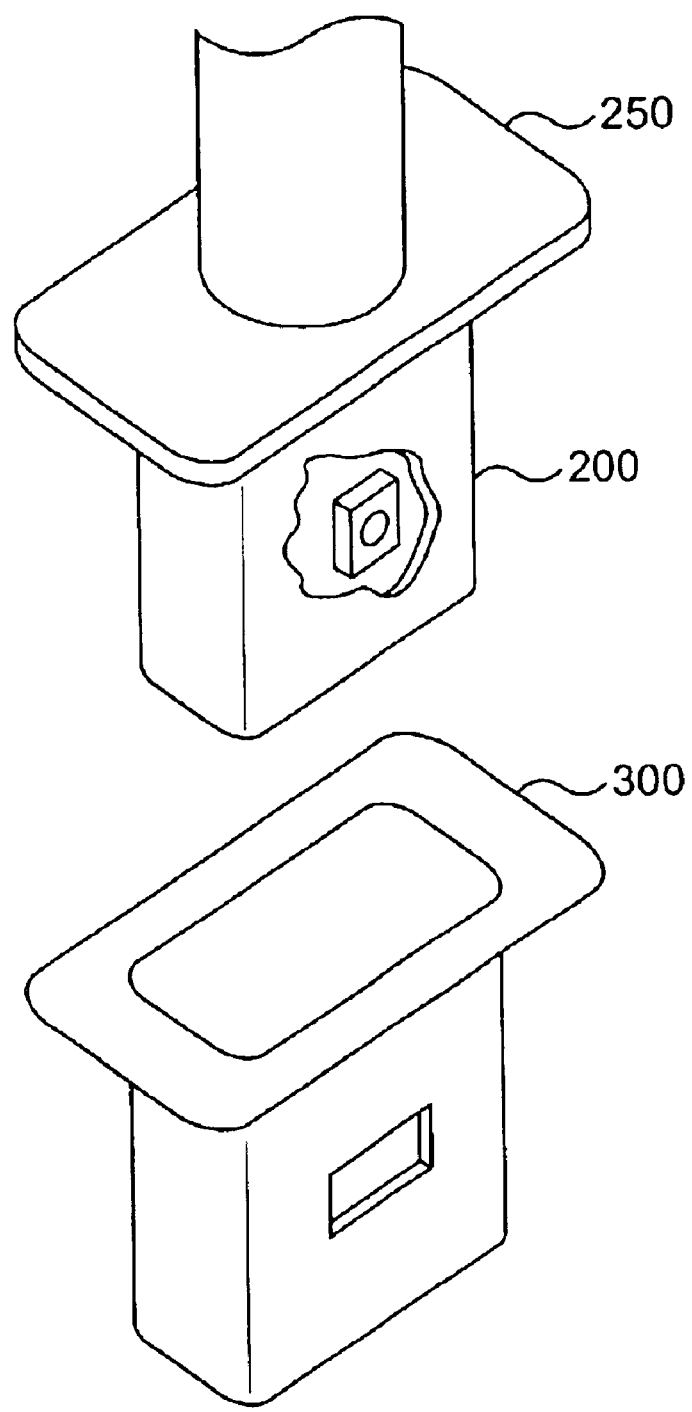
FIG. 8 is an isometric view of the retention device of another embodiment of the present invention.

As noted above, the truck bed cap of the first embodiment has flanges 60 that extend towards the inside of the cap from the lower portions of the cap. In one embodiment of the present invention, sections 110 and 120 of the retention device have protrusions 250, as can be seen in FIGS. 7 and 8, which in some embodiments are flanges, and in some other embodiments are round bars or square bars or crosses, on portions of the retention device. These protrusions 250 rest on the flanges 60 of the truck bed cap, imparting in one embodiment downward force onto the flange of the truck bed cap, thus helping to provide positive retention in the vertical direction. However, it is noted that in some embodiments, this protrusion 250 does not necessarily have to be in direct contact with the flange 60 of the truck bed cap. Indeed, it does not have to be in contact with the truck bed cap at all since the protrusion 250 can help retain the cap by allowing the cap to move upwards slightly or more than slightly before contacting the protrusion 250. This protrusion is used to attach the truck bed cap to the truck bed and also aid in truck bed cap retention in the event of a collision. Thus, in this embodiment, the sections 110 and 120 of the truck bed retention device help to provide horizontal and vertical positive retention to the truck bed cap. Further, other embodiments of the present invention could have a protrusion on sections 110 and 120 at or near the roof as well to provide yet another location for positive vertical retention. By way of example, a protrusion or a plurality of protrusions could be located just above the roof, extending past the holes in the roof.

In another embodiment of the present invention, as can be seen in FIG. 7, the truck bed cap retention device is attached to the truck bed by inserting a portion of the vertical section into stake pockets 1030 which are commonly found along the sides of a truck bed in the top surface of the outer panels. By way of example, these stake pockets are generally substantially rectangular in shape and usually have rounded edges on the four corners and allow for insertion of a male member into the pockets. Still further, truck bed stake pockets usually have openings 1040 in the bottom or along the sides to allow for insertion of, say, a bolt or other fastener through the holes. In the case of a bolt, the bolt could be used to secure the male portion that is inserted into the pocket to the truck, by passing the bolt through the walls of pocket and the stake 200 and/or 210, of vertical sections 110 and/or 120, thus helping to provide positive retention. It is noted that in one embodiment of the present invention, the stakes are elongated members that have horizontal cross-section that is similar to but slightly reduced in size than the horizontal cross-section of the stake pockets. The stakes can be rectangular or circular or square or oval, or any shape that will suitably interface with a stake pocket of a truck. Alternatively, in the case of a bolt, the bolt could be used to simply provide frictional retention on the male portion. In the first embodiment of the present invention, the sections 110 and 120 are provided with stakes 200 and 210. These stakes protrude from the bottom of sections 110 and 120 and are of a configuration to fit into a standard stake pocket in a standard pickup truck. However, it is noted that the present invention could be practiced with non-standard stake pockets by utilizing non-standard sized stakes. As noted above, in the first embodiment, the stakes are configured to be positively retained into the stake pockets. By way of example, the stake pockets could have a hole in them, preferably but not necessarily threaded to accept a bolt which would be inserted through openings in the stake pockets and, in the case of a threaded bolt, screwed into the stake pockets, or the stake, thus preventing the stakes, and of course, the sections, from being removed from the truck bed without first undoing the bolt. In another embodiment, as noted above, the bolt merely snugs up against this stake forming a friction fit. Thus, the stake is not positively retained but cannot be removed from the pocket unless the friction force of the clamp up is overcome. In the case of a bolt that is inserted into the stake, positive retention of the stake in both the horizontal and vertical direction is obtained. It is noted that in embodiments that utilize a protrusion 250 on the lower portion of the sections 110 and 120, the stake extends below the protrusion 250. Further, the present invention can be practiced with embodiments where the stake and protrusion comprise an entire section and/or the entire retention device (a plurality of stakes being preferred). It is further noted that embodiments utilizing a friction fit (e.g. non-through bolt) to secure the stake to the truck can still achieve positive retention with respect to the cap and the stake in both the horizontal and vertical directions. By utilizing stakes, drilling into the truck can be avoided. That is, the present invention can be practiced without drilling or otherwise adding holes to the truck. However, the present invention can be practiced with drilled holes in the truck as well, especially in the case where the stakes are utilized with vertically aligned bolts to assist in the retention of the cap assembly to the truck. (For example, bolts or screws that pass through holes or gaps in the protrusion of sections 110 and 120 and then into the truck.)

In other embodiments of the present invention, the stake is configured with a threaded hole or a floating bolt on at least one side of the stake, as is seen in FIG. 8. In such a configuration, the threaded bolt can be placed through a hole in the stake pocket and into the threaded hole in the stake (with a floating nut in the stake) and threaded into the hole. In such embodiments, positive retention of the stake in the stake pocket is obtained.

Figure 9:
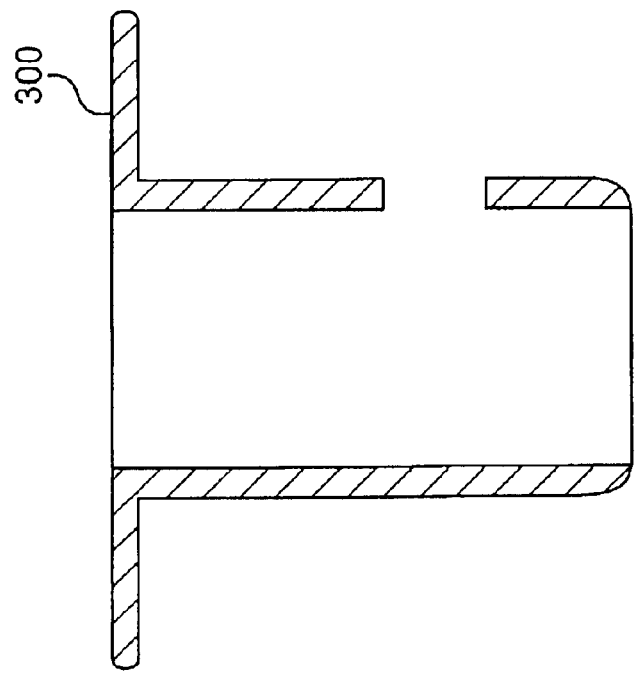
FIG. 9 is a cross-sectional view of an embodiment of the isolator of the present invention.

In other embodiments of the present invention, the retention device is practiced utilizing plastic isolators 300 as is shown in FIG. 9, that isolate the stake pockets from the stakes of the retention device, as can be seen in FIG. 8. In one embodiment, the plastic isolator 300 forms essentially a hollow rectangular structure with flanges on one end and tapered edges on the other end, as can be seen in FIG. 8. In one embodiment, this isolator is placed inside the stake pocket prior to inserting the stake into the pocket. Alternatively, the plastic isolator can be first placed on the stake and then the stake with the plastic isolator can be placed in the stake pocket.

It is noted here that various components of the present invention contact each other. When the term contact is used, it includes isolators or padding or insulation or other protective type material, as well as unprotected contact (e.g. metal on metal). Thus, for example, the stake contacts the stake pocket even though there is an isolator between the stake and the pocket, just as the stake contacts the stake pocket when there is no isolator between the two components. To this end, it is noted that the present invention can be practiced with isolators at many other locations in addition to the stakes.

Still further, it is noted that in other embodiments of the present invention, a stake is not utilized. For example, bolts could be used to bolt the sections 110 and 120 of the retention device down to the truck bed. For example, in the case of the retention device utilizing flanges, bolt holes could be machined into the protrusion or spaces could be placed into the flange to allow bolts to pass through the retention device and then through the flange on the cap and into the truck bed.

As is noted, the present invention aids in the retention of the truck bed cap in the event of a collision. This is because, for example, the truck bed retention device of the first embodiment protrudes through holes in the truck bed cap roof providing horizontal positive retention in at least two locations. Still further by example, in embodiments where the sections 110 and 120 protrude through the flange 60 along the outer sides of the truck bed cap, the sections protrude through the truck bed cap in four locations, thus providing horizontal retention in four locations. In another embodiment of the present invention, the truck bed cap cross section is in contact with the roof of the truck bed cap as well. In one embodiment of the present invention, the cross section directly contacts the roof of the cap or at least a portion of the roof of the cap. In another embodiment of the present invention, the connecting member does not directly contact the roof of the truck bed. Instead, an additional structural component such as a linking member or a brace 25 is placed between the cross section and the roof. Thus, in this embodiment of the present invention, positive retention of the cap is provided in the vertical direction as well where contact (either directly or indirectly) is made between the roof of the cap and the cross section. Thus, in the event of a collision, the truck bed cap is positively retained in both the horizontal and vertical directions. It is noted that in the case of the holes in the roof for sections 110 and 120, the positive retention can be obtained by having the roof directly contact members 110 or 120 or by placing a connecting component between the roof and sections 110 and 120. Thus, the present invention could be practiced by any means or device that will help provide positive retention of the truck bed cap in the horizontal direction and/or vertical direction where the retention is provided at the roof of the truck.

In an embodiment of the present invention, the truck bed cap retention device is made from at least three separate components: The first two components comprising all of or a portion of sections 110 and 120 and the third component comprising the cross section and possibly a portion of sections 110 and 120. Thus, in this embodiment, the first and second components can be configured to be placed directly through the holes in the roof of the cap, after which the cross section can be connected to the first and second components. Alternatively, in the case where the first two components do not protrude through the roof, but instead stop short of the roof, the third section would protrude through the roof to interface with the first and second sections. Alternatively, in the case where the cross section (e.g. the third component) is connected to the roof of the cap, the cross section can be connected to the roof of the cap first, then the first and second components can be inserted through the holes (if, of course, the third component does not protrude through the roof of the cap), then connected to the third component. This provides simple and easy assembly of the truck bed cap retention device to the truck and to the cap. In the three-component configuration, the first and second components could be configured to be either male or female, or a combination of the two, the third component being of reverse configuration (or a combination thereof), thus allowing mating with the respective components. It is noted that while the cross section is preferably of one piece configuration, other embodiments of the present invention could comprise a cross section of two or more separate components. That is, the present invention is not limited to and is not limited in any way by the number of components used to achieve the present invention. For example, whether the generally vertical sections comprise one piece or a plurality of pieces and the horizontal sections comprise one piece and the cross section comprises one piece or plurality of pieces does not impact the present invention as long as the truck bed cap can be positively retained to the truck bed of a pickup truck. Furthermore, it is noted that when the term component is used in the present invention, a component can be a single piece even if it is made from two or more pieces if those pieces are welded together or joined together in a permanent or semi-permanent fashion. Finally, a three piece construction of the truck bed cap retention device does not rule out the presence of additional but ancillary components, such as stakes or hooks or bolts.

To connect the components of the retention device, bolts or other positive retention devices could be used. Still further, spring retention buttons could be used to provide positive retention as well. These could include devices connected to the male connecting member such that in the normal retention position, the devices are configured to force a button upward through the surrounding female connector. To undo the components, it would be necessary to push the button inward, thus clearing the button from at least the inner surface of the female member, at which point the components could be pulled from each other.

In another embodiment of the present invention the sections 110 and 120 and the cross section are of one piece construction. That is, they form a continuous and solid device that extends upward from one side of the pickup truck across the bed and then downward to the other side of the pickup truck. In such a configuration, the truck bed cap could be molded around the truck bed retention device. The truck bed cap could be molded around the three piece device as well. Alternatively, the truck bed cap could be configured such that a forward portion could be removed from the rest of the cap. In the case of the first example, where the truck bed cap is molded completely around the retention device, the retention device would be removed with the cap. In embodiments utilizing stakes, the truck bed retention device could be configured so that the stakes could telescope into the sections 110 and 120 of the truck bed cap, thus permitting the truck bed cap and retention device to be laid flat on the ground or a driveway surface without damaging the truck bed stakes or other components of the truck bed retention device.

In the case of the latter example, where the truck bed cap is formed of two portions during attachment of the truck bed cap to a truck that is already configured with a truck bed cap retention device, the forward section of the truck bed cap could be first placed on the truck forward of the truck bed cap retention device and then the rear section of the cap could be placed in back of the truck bed retention device thus surrounding the truck bed retention device. Clamps, bolts or other forms of connecting devices could be used to connect the forward section to the rear section. If desired, a seal could be used to seal the space between the forward portion and the rear portion, thus preventing water intrusion into the bed of the truck. In another embodiment of the present invention, the forward section of the cap could be placed on the pickup truck, then the truck bed retention device could be placed on the truck and connected to the truck, and then the rearward section of the truck bed cap could be placed on the truck and connected to the truck.

In other embodiments of the present invention, the truck bed cap retention device is integral with the truck bed cap. For example and not by limitation, the truck bed cap retention device could be fiberglass that is formed with the fiberglass of the truck bed. Thus, the truck bed cap assembly could be of one-piece construction. Alternatively, some of the components could be integral with the cap, while others would attach to the cap/integrated portions of the retention device. For example, the beams of the vertical sections could be integral with the cap, and the stakes could be bolted to the beams.

Figure 10:
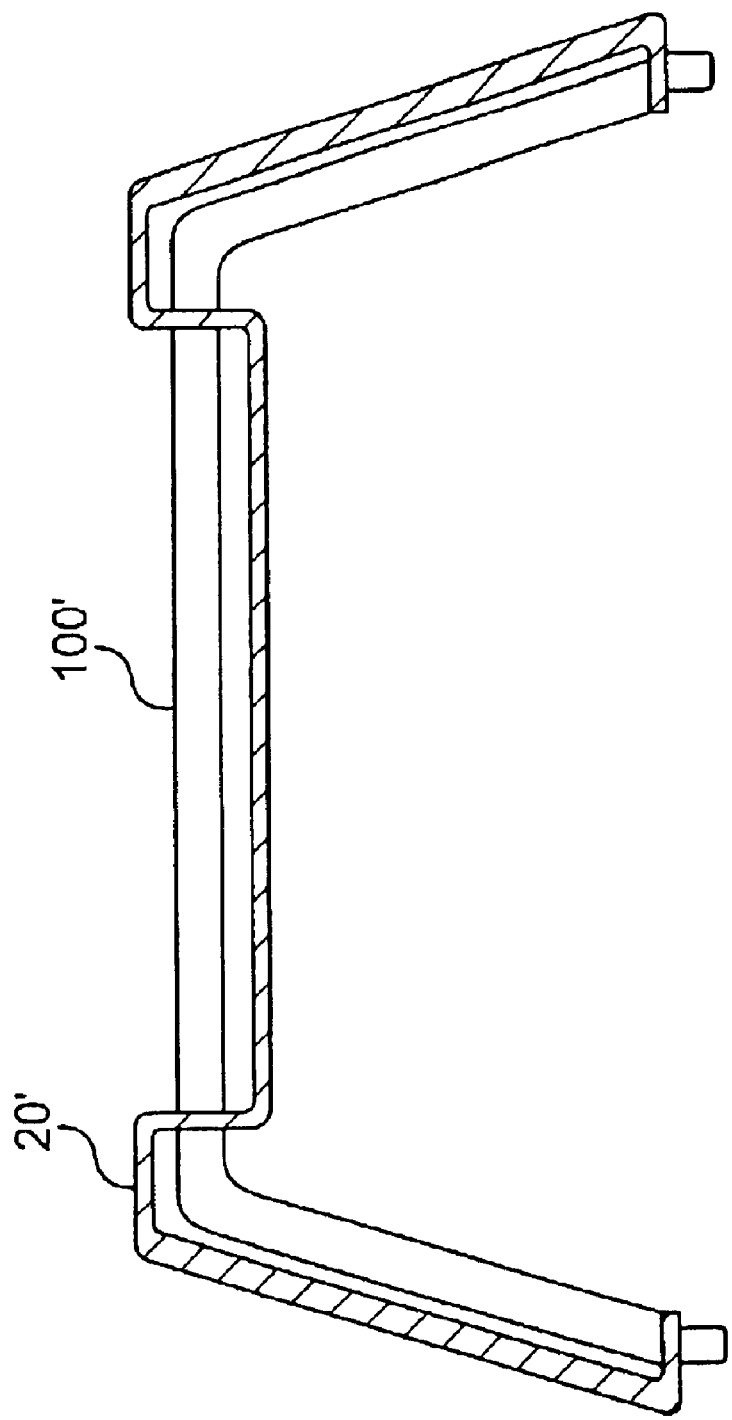
FIG. 10 is a rear view of another embodiment of the present invention.

It is noted that while most of the embodiments described above concentrate on a retention device 100' where the vertical sections protrude through vertical holes in the roof of the cap 20, the present invention can be practiced with the cross section protruding through horizontal holes in the roof of the cap 20', as is shown by way of example and not by limitation in FIG. 10. Indeed, in other embodiments of the present invention, the retention device can protrude through a horizontal hole and a vertical hole in the cap.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A truck bed cap assembly comprising:
   a rigid truck bed cap; and
   a truck bed cap retention device comprising two generally vertical sections and a cross section connecting the vertical sections; wherein
   the two generally vertical sections protrude through holes in the roof of the cap and are for attaching to a truck to provide positive retention of the truck bed cap to the truck in at least one direction, wherein the holes have a through axis that is substantially vertical, and wherein lower portions of the vertical sections are located proximate to respective sidewalls of the cap.

2. The truck bed cap assembly of claim 1, wherein the truck bed cap has a plurality of flanges that protrude from lower sides of the cap, the flanges having spaces to allow the vertical sections to pass through the flange.

3. The truck bed cap assembly of claim 2, wherein the spaces are holes to allow the vertical sections to pass through the flange.

4. The truck bed cap assembly of claim 2, wherein the flanges are notched to allow the vertical sections to pass through the flange.

5. The truck bed cap assembly of claim 1, wherein the roof of the cap is in contact with the vertical sections.

6. The truck bed cap assembly of claim 1, wherein at least one of the cross section and a linking member is in contact with the roof of the cap.

7. The truck bed cap assembly of claim 5, wherein the roof of the cap is in contact with the vertical sections at the holes in the cap.

8. The truck bed cap assembly of claim 7, wherein the structure of the roof of the cap is in contact with the vertical sections.

9. The truck bed cap assembly of claim 7, wherein the contact is formed at least by a seal.

10. The truck bed cap assembly of claim 9, wherein the seal is a gasket.

11. The truck bed cap assembly of claim 5, wherein the truck bed cap limits or substantially prevents leakage of rain water at the holes into the interior of the cap.

12. The truck bed cap assembly of claim 1, wherein the vertical sections and the cross section of the retention device is of one piece construction.

13. The truck bed cap assembly of claim 12, wherein the clip is formed around the retention device.

14. The truck bed cap assembly of claim 1, wherein the vertical sections are separate components and the cross section is a separate component, the vertical sections and the cross section of the truck bed cap being of at least 3-piece construction.

15. The truck bed cap assembly of claim 14, wherein the vertical sections and the cross section are of 3-piece construction.

16. The truck bed cap assembly of claim 15, wherein the vertical sections fit into the cross section.

17. The truck bed cap assembly of claim 1, wherein the truck bed cap retention device is mountable to a truck stake pocket.

18. The truck bed cap assembly of claim 1, wherein the truck bed cap retention device is mountable to a truck bed side wall top surface.

19. The truck bed cap assembly of claim 17, wherein the vertical sections are configured with a stake adapted to mate with a truck stake pocket.

20. The truck bed cap assembly of claim 19, wherein the stakes are part of the vertical sections.

21. The truck bed cap assembly of claim 19, wherein the stakes are provided with a threaded portion having an axis substantially normal to the vertical direction of the stake.

22. The truck bed cap assembly of claim 19, wherein the stakes are provided with a floating nut.

23. The truck bed cap assembly of claim 1, wherein the truck bed cap retention device is attachable to a truck with bolts.

24. The truck bed cap assembly of claim 1, wherein the truck bed cap retention device is located at about the longitudinal forward end of the cap.

25. The truck bed cap assembly of claim 1, wherein the cross section is located on the outside of the cap.

26. The truck bed cap assembly of claim 1, wherein the cross section is configured with attachment points on the outside of the cap.

27. The truck bed cap assembly of claim 1, wherein the vertical sections are provided with attachment points on the inside of the cap.

28. The truck bed cap assembly of claim 1, wherein the cross section is substantially parallel to the roof of the cap.

29. The truck bed cap assembly of claim 1, wherein the cap is formed integrally with the retention device.

30. A truck bed cap assembly comprising:
   a truck bed cap having a plurality of flanges that protrude from lower sides of the cap; and
   a truck bed cap retention device for interfacing with the truck bed cap, having a roof, and for attaching to a truck bed, the truck bed cap retention device further being for retaining the cap in both the horizontal and vertical directions when the retention device is attached to the truck bed and interfacing with the cap, wherein the truck bed cap retention device comprises a plurality of generally vertical sections comprising stakes adapted to mate with a truck stake pocket;

wherein the flanges have spaces adapted to permit the generally vertical sections to pass through the flange and be attached to a trunk; and wherein two of the generally vertical sections extend away from the truck bed and protrude through holes in the roof of the cap, wherein the holes have a through axis that is substantially vertical.

31. The truck bed cap assembly of claim 30, wherein the vertical sections have a protrusion that extends in the horizontal direction past the space in the flange when the retention device is attached to the truck to retain the cap to the truck.

32. The truck bed cap assembly of claim 31, wherein a flange of the cap has an upper flat surface facing away from the truck bed, and wherein the protrusions are flanges having a lower surface that has a portion that is substantially parallel to the upper flat surface of the flange of the cap.

33. The truck bed cap assembly of claim 32, wherein the protrusions interface with the upper surface of the flange of the cap.

34. The truck bed cap assembly of claim 30, wherein the two generally vertical sections that protrude through holes in the roof are connected by a cross section that extends proximate the roof of the cap substantially in the lateral direction of the roof of the cap on the outside of the cap.

35. A truck bed cap assembly comprising:

a truck bed cap having a plurality of flanges that protrude from lower sides of the cap; and a truck bed cap retention device for interfacing with the truck bed cap, having a roof, and for attaching to a truck bed, the truck bed cap retention device further being for retaining the cap in both the horizontal and vertical directions when the retention device is attached to the truck bed and interfacing with the cap, wherein the truck bed cap retention device comprises a plurality of generally vertical sections comprising stakes adapted to mate with a truck stake pocket;

wherein the flanges have spaces adapted to permit the generally vertical sections to pass through the flange and be attached to a truck;

wherein the vertical sections have a protrusion that extends in the horizontal direction past the space in the flange when the retention device is attached to the truck to retain the cap to the truck:

wherein a flange of the cap has an upper flat surface facing away from the truck bed, wherein the protrusions are flanges having a lower surface that has a portion that is substantially parallel to the upper flat surface of the flange of the cap;

wherein the protrusions extend away from all sides of the generally vertical sections; and wherein two of the generally vertical sections extend away from the truck bed and protrude through holes in the roof of the cap, wherein the holes have a through axis that is substantially vertical.

36. The truck bed cap assembly of claim 35, wherein the two generally vertical sections that protrude through holes in the roof are connected by a cross section that extends proximate the roof of the cap substantially in the lateral direction of the roof of the cap on the outside of the cap.

37. A truck bed cap assembly comprising:

a rigid truck bed cap; and a truck bed cap retention device comprising two generally vertical sections and a cross section connecting the vertical sections; wherein the cross section protrudes through holes in the roof of the cap and the vertical sections are for attaching to a truck to provide positive retention of the truck bed cap to the truck in at least one direction, wherein the holes have a through axis that is horizontal, and wherein lower portions of the vertical sections are located proximate to respective sidewalls of the cap.

38. A truck bed cap assembly comprising:

a rigid truck bed cap; and a truck bed cap retention device comprising one or more beams in an inverted "U" configuration; wherein a portion of the "U" protrudes through holes in an upper portion of the cap, and wherein the "U" is attachable to a truck to provide positive retention of the truck bed cap to the truck in at least one direction, and wherein lower portions of the inverted "U" are located proximate to respective sidewalls of the cap.

39. The truck bed cap assembly of claim 38, wherein the two legs of the "U" protrude through holes in the roof, and wherein the holes have a through axis that is substantially vertical.

40. The truck bed cap assembly of claim 38, wherein the component that connects the legs of the "U" protrudes through holes in the roof, and wherein the holes have a through axis that is substantially horizontal.

41. The truck bed cap assembly of claim 38, wherein the truck bed cap has a plurality of flanges that protrude from lower sides of the cap, the flanges having spaces to allow the legs of the "U" to pass through the flange.

42. The truck bed cap assembly of claim 38, wherein the cap is formed around the retention device.

43. The truck bed cap assembly of claim 38, wherein the retention device is of 3-piece construction.

44. A truck comprising:

a truck including a truck bed, and a truck bed cap assembly according to claim 1.

45. A truck bed cap assembly comprising:

a rigid truck bed cap; and a truck bed cap retention device comprising two generally vertical sections and a cross section connecting the vertical sections; wherein the two generally vertical sections protrude through holes in the roof of the cap and are for attaching to a truck to provide positive retention of the truck bed cap to the truck in at least one direction, and wherein the holes have a through axis that is substantially vertical.

46. The truck bed cap assembly of claim 45, wherein the truck bed cap has a plurality of flanges that protrude from lower sides of the cap, the flanges having spaces to allow the vertical sections to pass through the flange.

47. The truck bed cap assembly of claim 45, wherein the roof of the cap is in contact with the vertical sections.

48. The truck bed cap assembly of claim 45, wherein at least one of the cross section and a linking member is in contact with the roof of the cap.

49. The truck bed cap assembly of claim 45, wherein the truck bed cap retention device is mountable to a truck stake pocket.

50. The truck bed cap assembly of claim 45, wherein the truck bed cap retention device is mountable to a truck bed side wall top surface.

51. A truck bed cap assembly comprising:

a rigid truck bed cap; and a truck bed cap retention device comprising two generally vertical sections and a cross section connecting the vertical sections; wherein the cross section protrudes through holes in the roof of the cap and the vertical sections are for attaching to a truck to provide positive retention of the truck bed cap to the truck in at least one direction, and wherein the holes have a through axis that is substantially horizontal.

52. A truck bed cap assembly comprising:

a rigid truck bed cap; and a truck bed cap retention device comprising one or more beams in an inverted "U" configuration; wherein a portion of the "U" protrudes through holes in an upper portion of the cap, and wherein the "U" is attachable to a truck to provide positive retention of the truck bed cap to the truck in at least one direction.

53. The truck bed cap assembly of claim 52, wherein the two legs of the "U" protrude through holes in the cap, and wherein the holes have a through axis that is substantially vertical.

54. The truck bed cap assembly of claim 52, wherein a component that connects the legs of the "U" protrudes through holes in the roof, and wherein the holes have a through axis that is substantially horizontal.

* * * * *